US011703945B2

(12) United States Patent
Fan et al.

(10) Patent No.: US 11,703,945 B2
(45) Date of Patent: Jul. 18, 2023

(54) AUGMENTED REALITY INFORMATION PROMPTING SYSTEM, DISPLAY CONTROL METHOD, EQUIPMENT AND MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Jinghua Miao, Beijing (CN); Shuai Hao, Beijing (CN); Chao Zheng, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/459,271

(22) Filed: Aug. 27, 2021

(65) Prior Publication Data

US 2022/0155853 A1    May 19, 2022

(30) Foreign Application Priority Data

Nov. 19, 2020   (CN) .......................... 202011307663.X

(51) Int. Cl.
*G06F 3/01*     (2006.01)
*G06F 3/0483*   (2013.01)
(Continued)

(52) U.S. Cl.
CPC .............. *G06F 3/012* (2013.01); *G06F 3/017* (2013.01); *G06F 3/041* (2013.01); *G06F 3/0483* (2013.01); *H04M 1/72412* (2021.01)

(58) Field of Classification Search
CPC .......... G06F 3/012; G06F 3/017; G06F 3/041; G06F 3/0483; H04M 1/72412
See application file for complete search history.

(56) References Cited

U.S. PATENT DOCUMENTS

RE42,336 E  *  5/2011  Fateh ...................... G06F 3/011
                                                      715/729
8,643,951 B1 *  2/2014  Wheeler ............... G06F 3/0481
                                                      359/630

(Continued)

*Primary Examiner* — Benyam Ketema
(74) *Attorney, Agent, or Firm* — Womble Bond Dickinson (US) LLP

(57) ABSTRACT

The present disclosure provides an augmented reality information prompting system, including: a head pose detector to detect a user's head pose to generate head pose data; an operation control device to generate operation control data based on the user's operation; and a processor to receive the head pose data from the head pose detector and generate a first display control instruction based on the head pose data, and to receive the operation control data from the operation control device and generate a second display control instruction based on the operation control data; an augmented reality display configured to receive the first and second display control instructions from the processor, and to operate prompt information based on the first and second display control instructions. The present disclosure further relates to a display control method used for the system, as well as an electronic equipment and a non-transitory computer-readable storage medium.

14 Claims, 6 Drawing Sheets

(51) Int. Cl.
*G06F 3/041* (2006.01)
*H04M 1/72412* (2021.01)

(56) References Cited

U.S. PATENT DOCUMENTS

| | | | | |
|---|---|---|---|---|
| 9,268,136 | B1* | 2/2016 | Starner | G06F 3/03547 |
| 9,335,547 | B2* | 5/2016 | Takano | G06F 3/013 |
| 9,557,152 | B2* | 1/2017 | Starner | G06F 3/011 |
| 9,575,563 | B1* | 2/2017 | Li | G02B 27/0172 |
| 9,671,566 | B2* | 6/2017 | Abovitz | G06F 3/0482 |
| 9,671,615 | B1* | 6/2017 | Vallius | G06T 19/006 |
| 10,018,844 | B2* | 7/2018 | Levola | G02B 6/00 |
| 10,181,219 | B1* | 1/2019 | Murphy | A63F 13/26 |
| 10,185,147 | B2* | 1/2019 | Lewis | H04L 5/0035 |
| 10,345,925 | B2* | 7/2019 | Du Bois | G06F 3/0346 |
| 10,678,324 | B2* | 6/2020 | Miller | G06F 3/011 |
| 2011/0037712 | A1* | 2/2011 | Kim | G06F 3/0488 |
| | | | | 345/173 |
| 2011/0250962 | A1* | 10/2011 | Feiner | A63F 13/428 |
| | | | | 463/31 |
| 2012/0050141 | A1* | 3/2012 | Border | G02B 27/01 |
| | | | | 345/8 |
| 2012/0154277 | A1* | 6/2012 | Bar-Zeev | G02B 27/017 |
| | | | | 345/158 |
| 2012/0188148 | A1* | 7/2012 | DeJong | G06F 3/011 |
| | | | | 359/630 |
| 2013/0106674 | A1* | 5/2013 | Wheeler | G02B 27/0101 |
| | | | | 345/8 |
| 2013/0286046 | A1* | 10/2013 | Rodriguez | H04N 21/41415 |
| | | | | 345/633 |
| 2014/0285404 | A1* | 9/2014 | Takano | G06F 3/04812 |
| | | | | 345/8 |
| 2015/0002542 | A1* | 1/2015 | Chan | G02B 27/017 |
| | | | | 345/633 |
| 2015/0016777 | A1* | 1/2015 | Abovitz | G02B 27/0093 |
| | | | | 385/37 |
| 2015/0061973 | A1* | 3/2015 | Park | H04N 21/4223 |
| | | | | 345/8 |
| 2015/0199848 | A1* | 7/2015 | Kim | G06T 11/00 |
| | | | | 345/633 |
| 2015/0234456 | A1* | 8/2015 | Cho | G02B 27/0172 |
| | | | | 345/156 |
| 2015/0302665 | A1* | 10/2015 | Miller | G02B 27/0093 |
| | | | | 345/419 |
| 2015/0309264 | A1* | 10/2015 | Abovitz | G02B 6/32 |
| | | | | 385/33 |
| 2016/0026253 | A1* | 1/2016 | Bradski | H04N 13/128 |
| | | | | 345/8 |
| 2016/0161240 | A1* | 6/2016 | Starner | G01P 15/00 |
| | | | | 702/150 |
| 2016/0162020 | A1* | 6/2016 | Lehman | G06F 3/011 |
| | | | | 715/835 |
| 2016/0267712 | A1* | 9/2016 | Nartker | G06T 19/006 |
| 2016/0378204 | A1* | 12/2016 | Chen | G06V 20/20 |
| | | | | 345/156 |
| 2017/0061696 | A1* | 3/2017 | Li | G02B 27/017 |
| 2017/0078825 | A1* | 3/2017 | Mangiat | G06F 1/163 |
| 2017/0139672 | A1* | 5/2017 | Li | G06F 3/017 |
| 2017/0205903 | A1* | 7/2017 | Miller | G06T 7/174 |
| 2017/0213388 | A1* | 7/2017 | Margolis | G09G 3/007 |
| 2017/0322623 | A1* | 11/2017 | McKenzie | G06F 3/04886 |
| 2018/0088185 | A1* | 3/2018 | Woods | G06F 3/0304 |
| 2018/0136466 | A1* | 5/2018 | Ko | G06F 3/147 |
| 2018/0218543 | A1* | 8/2018 | Vembar | G06T 7/70 |
| 2019/0027120 | A1* | 1/2019 | Croxford | G09G 3/001 |
| 2019/0101758 | A1* | 4/2019 | Zhu | G06T 3/00 |
| 2019/0102905 | A1* | 4/2019 | Skogö | G06F 3/012 |
| 2019/0243123 | A1* | 8/2019 | Bohn | G02B 6/122 |
| 2020/0033942 | A1* | 1/2020 | Saito | G06F 3/167 |
| 2020/0042081 | A1* | 2/2020 | Miller | G06F 3/012 |
| 2020/0258481 | A1* | 8/2020 | Woo | G02B 27/017 |
| 2021/0341996 | A1* | 11/2021 | Miller | G06F 3/011 |

\* cited by examiner

AUGMENTED REALITY INFORMATION PROMPTING SYSTEM, DISPLAY CONTROL METHOD, EQUIPMENT AND MEDIUM

CROSS REFERENCE TO RELATED APPLICATIONS

The present application claims priority to Chinese patent application No. 202011307663.X, with application date Nov. 19, 2020, the entire content of which is incorporated herein by reference.

TECHNICAL FIELD

The present disclosure generally relates to the field of display technology, and in particular, to an augmented reality information prompting system and a display control method used therefor, as well as an electronic equipment and a non-transitory computer-readable storage medium.

BACKGROUND

An information prompting system, such as a teleprompter, generally displays the content of a document through a display device in order to prompt the user. The display device usually displays the content of the document at a fixed position, or reflects the content of the document displayed onto a special coated glass disposed at a 45-degree angle in front of the camera lens. By reflecting the content of the document, the speaker can also face the camera while watching the content of the document. The speaker, the teleprompter, and the camera must meet the needs of fixed settings in order to produce the intimacy that the speaker always faces to the audience.

However, these existing teleprompters are all composed of specialized mechanical devices. They are large in size and fixed in position. They need to be installed on a special stand. The speaker needs to look at the designated position to get the prompt content, such that the speaker cannot interact well with the audience during the speech, and the content of the speech cannot be protected by privacy. Therefore, the existing teleprompters still have many limitations.

SUMMARY

According to an aspect of the present disclosure, an augmented reality information prompting system is provided including: a head pose detector configured to detect a user's head pose to generate head pose data; an operation control device configured to generate operation control data based on the user's operation; a processor configured to receive the head pose data from the head pose detector and generate a first display control instruction based on the head pose data, and to receive the operation control data from the operation control device and generate a second display control instruction based on the operation control data; and an augmented reality display configured to receive the first display control instruction and the second display control instruction from the processor, and to operate prompt information based on the first display control instruction and the second display control instruction.

According to some exemplary embodiments, the head pose detector comprises an inertial measurement unit.

According to some exemplary embodiments, the processor determines the user's head rotation angle value based on the head pose data, and when the head rotation angle value is within a predetermined range, the first display control instruction instructs the augmented reality display to display the prompt information.

According to some exemplary embodiments, the first display control instruction instructs the augmented reality display to suspend display when the head rotation angle value is outside the predetermined range.

According to some exemplary embodiments, the second display control instruction instructs the augmented reality display to perform a page turning operation on the prompt information.

According to some exemplary embodiments, the augmented reality information prompting system includes a head-mounted display equipment, wherein the head-mounted display equipment comprises the head pose detector, the operation control device, the processor and the augmented reality display, and wherein the operation control device is further configured to detect a gesture of the user to generate the operation control data.

According to some exemplary embodiments, the augmented reality information prompting system includes a head-mounted display equipment and a control handle, wherein the head-mounted display equipment comprises the head pose detector, the processor and the augmented reality display, the control handle comprises the operation control device, and wherein the operation control device is configured to receive input data of the user to generate the operation control data.

According to some exemplary embodiments, the augmented reality information prompting system includes a head-mounted display equipment and a mobile equipment, wherein the head-mounted display equipment comprises the head pose detector and the augmented reality display, and the mobile equipment comprises the operation control device and the processor.

According to some exemplary embodiments, the operation control device comprises one or more buttons of the mobile equipment, and is configured to receive input data of the user to generate the operation control data.

According to some exemplary embodiments, the operation control device comprises a touch screen of the mobile equipment, and the touch screen is configured to display a prompt information operation interface for receiving input data of the user to generate the operation control data.

According to some exemplary embodiments, the augmented reality information prompting system includes a head-mounted display equipment, a mobile equipment and a control handle, wherein the head-mounted display equipment comprises the head pose detector and the augmented reality display, the mobile equipment comprises the processor, the control handle comprises the operation control device, and wherein the operation control device is configured to receive input data of the user to generate the operation control data.

According to some exemplary embodiments, the mobile equipment comprises a display screen, and when the augmented reality display displays the prompt information, the display screen of the mobile equipment displays content that is different from the prompt information or suspends display.

According to another aspect of the present disclosure, a display control method for controlling the above-mentioned augmented reality information prompting system is provided, including the following steps: generating the head pose data based on the user's head pose; generating the operation control data based on the user's operation; generating the first display control instruction based on the head pose data; generating the second display control instruction based on the operation control data; and operating the prompt information based on the first display control instruction and the second display control instruction.

According to some exemplary embodiments, the step of generating the first display control instruction based on the head pose data comprises: determining the user's head rotation angle value based on the head pose data; generating the first display control instruction based on the head rotation angle value.

According to some exemplary embodiments, when the head rotation angle value is within a predetermined range, the first display control instruction instructs the augmented reality display to display the prompt information; when the head rotation angle value is outside the predetermined range, the first display control instruction instructs the augmented reality display to suspend display.

According to some exemplary embodiments, the step of generating the operation control data based on the user's operation comprises: generating the operation control data based on the user's gesture.

According to some exemplary embodiments, the step of generating the operation control data based on the user's operation comprises: generating the operation control data based on input data of the user.

According to another aspect of the present disclosure, an electronic equipment is provided, which includes a memory, a processor, and a computer program stored in the memory and capable of being run in the processor, and the computer program, when run by the processor, implements the above-mentioned display control method.

According to another aspect of the present disclosure, a non-transitory computer-readable storage medium is provided, on which a computer program is stored, the computer program, when run by a processor, implements the above-mentioned display control method.

The exemplary embodiments of the present disclosure collect the head pose data of the wearer of the head-mounted display equipment, and use the head pose data to control the display state of the content of the prompt information in the head-mounted display equipment, thereby solving the problem that the head-mounted display equipment continuously displays the prompt information content, which causes the user's line of sight to be blocked. By adding a mechanism of different display on two screens, the speech time reminder and the privacy protection of the prompt content are provided, which greatly improves user experience.

BRIEF DESCRIPTION OF DRAWINGS

Hereinafter, the exemplary embodiments of the present disclosure will be described in detail with reference to the accompanying drawings, so that further characteristics, purposes, and advantages of the present application will become more apparent. In the drawings.

Figure 1:
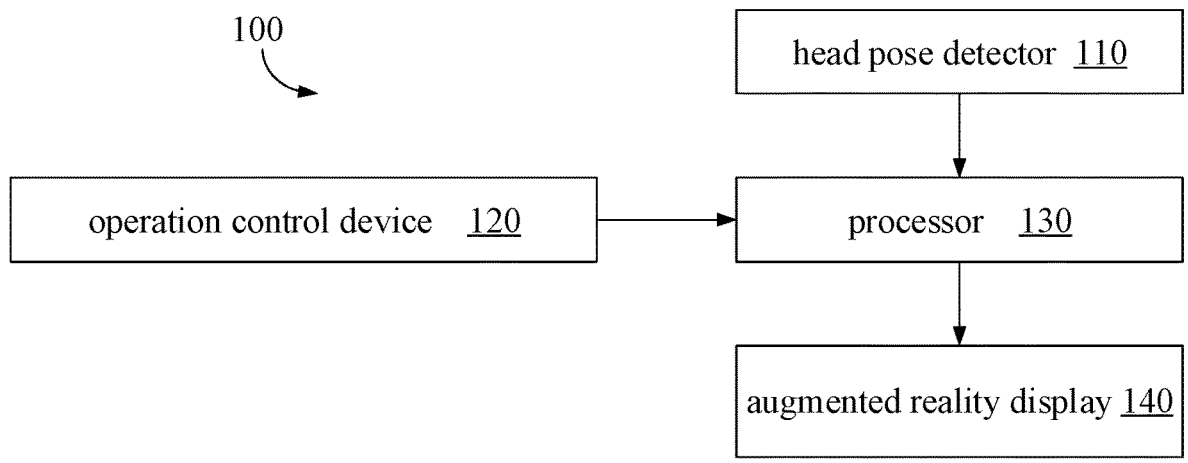
FIG. 1 schematically shows the structure of an augmented reality information prompting system provided according to an exemplary embodiment of the present disclosure in the form of a block diagram.

It should be understood that the drawings are only used to schematically show the exemplary embodiments of the present disclosure, and therefore, they are not necessarily drawn to scale. In addition, throughout the drawings, the same or similar elements, components and parts are indicated by the same or similar reference signs.

DETAILED DESCRIPTION OF EMBODIMENTS

The present disclosure will be further described in detail hereinafter with reference to the accompanying drawings and embodiments. It can be understood that the exemplary embodiments described here are only used to explain the relevant disclosure, but not to limit the present disclosure. In addition, it should be noted that, to facilitate description, only the parts related to the disclosure are shown in the drawings.

It should be noted that, in the case of no conflict, each exemplary embodiment in the present disclosure and the features in each exemplary embodiment can be combined with each other. Hereinafter, the present application will be described in detail with reference to the drawings and in conjunction with the embodiments.

Terms used in the present disclosure are only intended for describing various exemplary embodiments of the present disclosure, rather than limiting the present disclosure. As used herein, singular forms of "a", "an" and "the" are intended to also comprise plural forms, unless explicitly indicated otherwise in the context. It should be further understood that when used in the present disclosure, the terms of "comprise" and "include" indicate the presence of the indicated features, but does not exclude the presence of one or more other features or the addition of one or more other features. As used herein, the term of "and/or" comprises any and all combination(s) of one or more of the items associated and listed. It will be understood that although the terms "first", "second", "third", etc. may be used herein to describe various features, these features should not be limited by these terms. These terms are only used to distinguish one feature from another.

Unless otherwise defined, all terms (including both technical terms and scientific terms) used herein have the same meaning as usually understood by one having ordinary skills in the art to which the present disclosure pertains. It should be further understood that terms such as those defined in a commonly used dictionary should be construed as having the same meanings as they do in the related art and/or in the context of this specification, and should not be construed in an ideal sense or an overly formal sense, unless explicitly defined so herein.

Referring to FIG. 1, it schematically shows the structure of an augmented reality information prompting system provided according to an exemplary embodiment of the present disclosure in the form of a block diagram. As shown in FIG. 1, the augmented reality information prompting system 100 may include: a head pose detector 110, an operation control device 120, a processor 130 and an augmented reality display 140. The head pose detector 110 may be configured to detect the head pose of the user to generate head pose data, and send the head pose data to the processor 130. The operation control device 120 may be configured to generate operation control data based on the operation of the user, and may send the operation control data to the processor 130. The processor 130 may be configured to receive the head pose data from the head pose detector 110, generate a first display control instruction based on the head pose data, and to receive the operation control data from the operation control device 120, and generate a second display control instruction based on the operation control data. The processor 130 may send the first display control instruction and the second display control instruction to the augmented reality display 140. The augmented reality display 140 may be configured to receive the first display control instruction and the second display control instruction from the processor 130, and to perform corresponding operations on the prompt information based on the first display control instruction and the second display control instruction. It should be understood that any suitable form of communication connection can be established among the head pose detector 110, the operation control device 120, the processor 130 and the augmented reality display 140, as long as the transmission of the above-mentioned information and data streams can be realized. The present disclosure does not make any limitation to this.

According to some exemplary embodiments of the present disclosure, the head pose detector 110 may be an inertial measurement unit (IMU). The inertial measurement unit is a device used to measure the three-axis attitude angle (or angular velocity) and acceleration of an object. In an exemplary embodiment according to the present disclosure, the inertial measurement unit may be used to collect the user's head pose data and send it to the processor 130. However, it should be understood that the head pose detector 110 may be any detector capable of detecting the head pose of the user. The present disclosure does not make any limitation to this.

The operation control device 120 is used to receive the user's operations, for example, but not limited to, the operations such as updating (for example, turning pages), zooming in or zooming out of prompt information, and to generate the corresponding operation control data. According to some exemplary embodiments of the present disclosure, the operation control device 120 may be a detector capable of detecting the user's gesture, so as to be able to generate the corresponding operation control data according to the user's gesture. According to other exemplary embodiments of the present disclosure, the operation control device 120 may be a control handle, such as but not limited to a Bluetooth handle, a projector control pen, and the like. The user can perform input operations by the buttons on the control handle, so that the operation control device 120 can generate the corresponding operation control data. It should be understood that the operation control device 120 may be any suitable operation control device, as long as it can generate the corresponding operation control data based on the user's operations. The present disclosure does not make any limitation to this.

Similarly, the processor 130 and the augmented reality display 140 may also be any suitable devices, which are not limited in the present disclosure. It should be understood that the head pose detector 110, the operation control device 120, the processor 130 and the augmented reality display 140 may be implemented as the augmented reality information prompting system 100 in different forms, which will be described in detail hereinafter.

Figure 2:
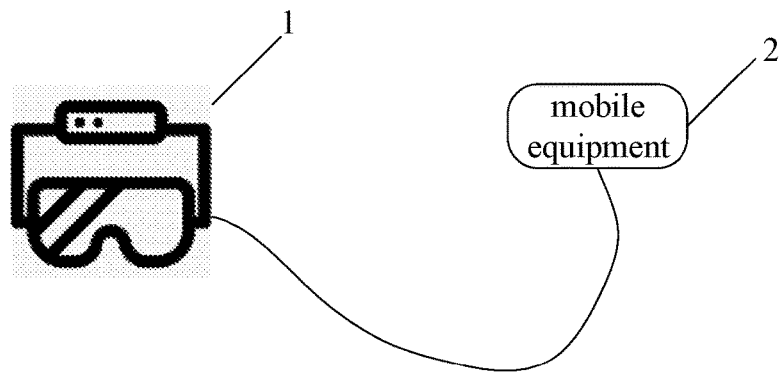
FIG. 2 schematically shows an implementation of the augmented reality information prompting system provided according to the exemplary embodiment of the present disclosure.

Please referring to FIG. 2, it schematically shows an implementation of the augmented reality information prompting system provided according to the exemplary embodiment of the present disclosure. As shown in FIG. 2, the augmented reality information prompting system includes a head-mounted display equipment 1 and a mobile equipment 2, and a communication connection is established between the head-mounted display equipment 1 and the mobile equipment 2. For example, the head-mounted display equipment 1 and the mobile equipment 2 may be connected through an OTG data cable, or through any other suitable wired or wireless communication manner. The mobile equipment 2 supports DP (Display Port) video output protocol.

Figure 3:
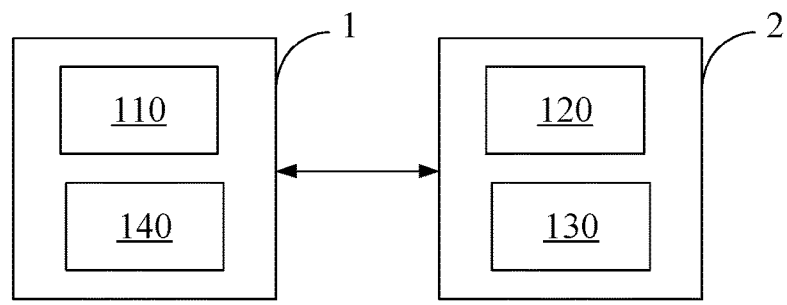
FIG. 3 schematically shows the structure of the implementation of the augmented reality information prompting system shown in FIG. 2 in the form of a block diagram.

Referring to FIG. 3 in combination, it schematically shows the structure of the implementation of the augmented reality information prompting system shown in FIG. 2 in the form of a block diagram. As shown in FIG. 3, the head-mounted display equipment 1 may include the aforementioned head pose detector 110 and the augmented reality display 140, and the mobile equipment 2 may include the aforementioned operation control device 120 and the processor 130. The head pose detector 110 can be used to collect head pose data of the wearer and send the head pose data to the processor 130, and the augmented reality display 140 receives corresponding display control instructions sent by the processor 130.

The processor 130 in the mobile equipment 2 is used to receive head pose data from the head-mounted display equipment 1, and to generate a first display control instruction according to the head pose data. The first display control instruction is used to control the display state of the prompt information on the augmented reality display 140 of the head-mounted display equipment 1.

The above-mentioned prompt information may be the content of the prompt text or graphics. As a non-limiting example, the content of the prompt text may be the content of the annotation corresponding to the speech draft during the speech, or the content of the comments. For example, when a speechmaker uses a PPT slide show, no comments are displayed, and the content of the comments is displayed on the speechmaker's head-mounted display equipment.

As a non-limiting example, the aforementioned head-mounted display equipment 1 including the augmented reality display 140 may be a pair of augmented reality display glasses, that is, AR glasses, which have a thin and light design and are therefore very portable.

The above-mentioned processor 130 may be a functional module provided in the mobile equipment 2, but in other exemplary embodiments, the processor 130 may also be another terminal or server, or may be a functional module in another terminal or a functional module in another server. For example, the head-mounted display equipment can upload head pose data to a remote server or a cloud server, and can receive display control instructions returned from the remote server or the cloud server. The display control instructions are used to control the display state of the prompt information on the head-mounted display equipment. In the embodiment shown in FIG. 3, the processor 130 is provided in the mobile equipment 2, which is convenient for the user to carry, effectively improves the portability of the prompting system, and also improves the efficiency of the prompting operation.

As a non-limiting example, the mobile equipment 2 may be various suitable electronic equipments, including but not limited to, a smart phone, a tablet computer, a notebook computer, a personal digital terminal and the like. The mobile equipment 2 may include a processor and a display screen, wherein the processor may be used to generate display control instructions according to head posture data, and the display screen may be used to display a prompt information operation interface or other interface images. In addition, the display screen of the mobile equipment may be a touch screen or the like.

It should be understood that the head pose detector 110 included in the head-mounted display equipment 1 may includes an inertial measurement unit, and a communication connection is established between the inertial measurement unit and the processor 130. The inertial measurement unit may be used to collect the head pose data of the wearer and send the head pose data to the processor 130.

The head-mounted display equipment 1 further includes a first display screen (not shown in the figure), which may be a display screen of the augmented reality display 140 included in the head-mounted display equipment 1. The first display screen can be used to display the content of the prompt information received from the mobile equipment and other content that needs to be displayed.

The exemplary embodiments of the present disclosure customize the functions of the head-mounted display equipment, so that only the first display screen and the inertial measurement unit need to be provided in the head-mounted display equipment, thereby effectively reducing the head load of the wearer of the head-mounted display equipment.

The above-mentioned inertial measurement unit can be used to collect the head pose data of the wearer in real time. In some exemplary embodiments, the inertial measurement unit may be connected to a mobile equipment as a USB device. For example, the data collected by the inertial measurement unit can be obtained by using the Android USB Host to communicate with the HID device. In this case, the inertial measurement unit and the mobile equipment can be connected through an OTG data cable.

The above-mentioned mobile equipment 2 may include a processor 130, which may be used to calculate the wearer's head rotation angle value according to the head pose data, and determine whether the head rotation angle value is within a predetermined content display angle value range. When the head rotation angle value is within the predetermined content display angle value range, a first display control instruction is generated, and the first display control instruction is used to control the display state of the content of the prompt information on the head-mounted display equipment 1 to be a normal display.

The first display control instruction may include the text content to be displayed and the display state corresponding to the text content.

As a non-limiting example, the processor 130 can be used to obtain acceleration readings collected by the accelerometer of the inertial measurement unit, and can calculate the roll angle and the pitch angle of the inertial measurement unit according to the acceleration readings.

Figure 4:
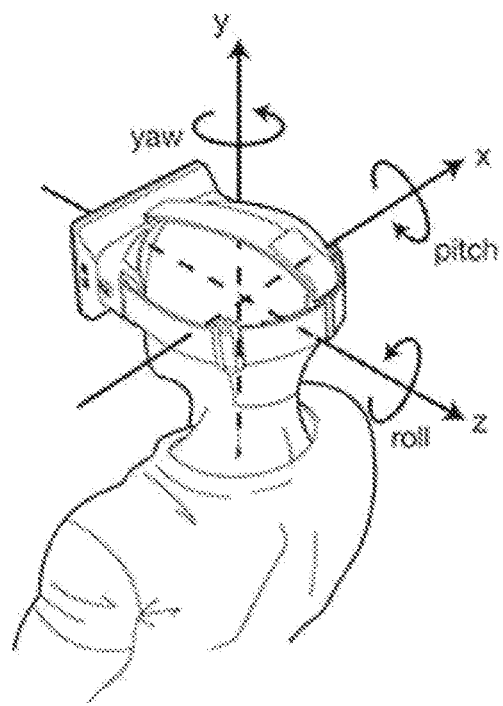
FIG. 4 schematically shows various angles with respect to the head rotation when the user wears the head-mounted display equipment.

As shown in FIG. 4, the yaw angle represents the rotation angle around the y-axis in the height direction of the human body when standing, and the pitch angle represents the rotation angle around the x-axis perpendicular to the y-axis and along the direction from left side to right side of the human body. The roll angle represents the angle of rotation around the z-axis that is perpendicular to both the x-axis and the y-axis.

The processor 130 may also be used to calculate the yaw angle of the inertial measurement unit according to the roll angle and the pitch angle of the inertial measurement unit. The yaw angle is also referred to as the azimuth angle. The yaw angle is the Euler angle of the target direction. Euler angle can be used to indicate the rotation of the head in space, such as rotating around the z, y, and x axes by a fixed angle, respectively, in accordance with the predetermined sequence.

The processor 130 may also be used to determine the head rotation angle value based on the Euler angle of the target direction. For example, the processor is also used to calculate the wearer's head rotation angle value according to the currently calculated yaw angle and the initial yaw angle corresponding to the initial pose data. The initial pose data is collected during the initial configuration of the head-mounted display equipment.

The preset content display angle value refers to the difference between the Euler angle of the target direction and the initial yaw angle corresponding to the initial pose data. The above-mentioned preset content display angle value range can be set through the setting interface provided by the mobile equipment 2, or set according to the user's usage habits. The user's operating habit data collected when the user is wearing the head-mounted display equipment can also be obtained, and the user's operating habit data can be analyzed to obtain the user's habitual head rotation angle range as the content display angle value range. Here, the content display angle value can also increase the offset range according to user habits to obtain the angle range corresponding to the content display angle value. Taking the content display angle value of 30° as an example, the angle range may be ±30°±0.5°.

For example, when the head rotation angle value detected by the mobile equipment is within the content display angle value range, the mobile equipment 2 sends a first display control instruction to the head-mounted display equipment 1, and the first display control instruction is used to allow the content of the prompt information to be displayed on the head-mounted display equipment, that is, to instruct that the content of the prompt information is visible. The content display angle value range is, for example, ±50°, wherein +50° represents the left head rotation angle value, or −50° represents the right head rotation angle value.

When the user is looking straight ahead and interacting with the audience, the mobile equipment 2 detects that the obtained head rotation angle value is not within the range of the content display angle value, and the mobile equipment 2 sends the first display control instruction to the head-mounted display equipment 1. At this time, the first display control instruction is used to suspend displaying the content of the prompt information on the head-mounted display equipment 1, that is, to instruct that the content of the prompt information is invisible.

Through the above method, the wearer of the head-mounted display equipment can interact with the audience more naturally during the speech, which effectively solves the problem of continuous display of prompt words on the head-mounted display equipment, and improves user satisfaction.

Before calculating the head rotation angle value of the wearer according to the head pose data, the processor 130 may also obtain the head pose data from the head pose detector 110 in the head-mounted display equipment 1 at a preset time interval. The above-mentioned preset time interval may be, for example, 2 ms. That is, data is obtained every 2 ms.

In order to avoid the problem of the wearer's line of sight being blocked due to the long-term display of prompt words on the head-mounted display equipment 1, the augmented reality information prompting system according to an exemplary embodiment of the present disclosure proposes to collect the head pose data of the wearer of the head-mounted display equipment, and then determine the wearer's head rotation angle value according to the head pose data, and compare the head rotation angle value with the preset content display angle value range, to trigger the intermittent display of the prompt content on the head-mounted display equipment 1, thereby effectively solving the problem of the wearer's line of sight being blocked.

In addition, when the prompt content is displayed on the head-mounted display equipment 1, usually the prompt content is also displayed on the mobile equipment 2, which results in that the displayed prompt content does not have privacy. In order to better enhance the security of the prompt content display, the present disclosure also proposes a mechanism of different display on two screens to solve this problem.

Figure 5:
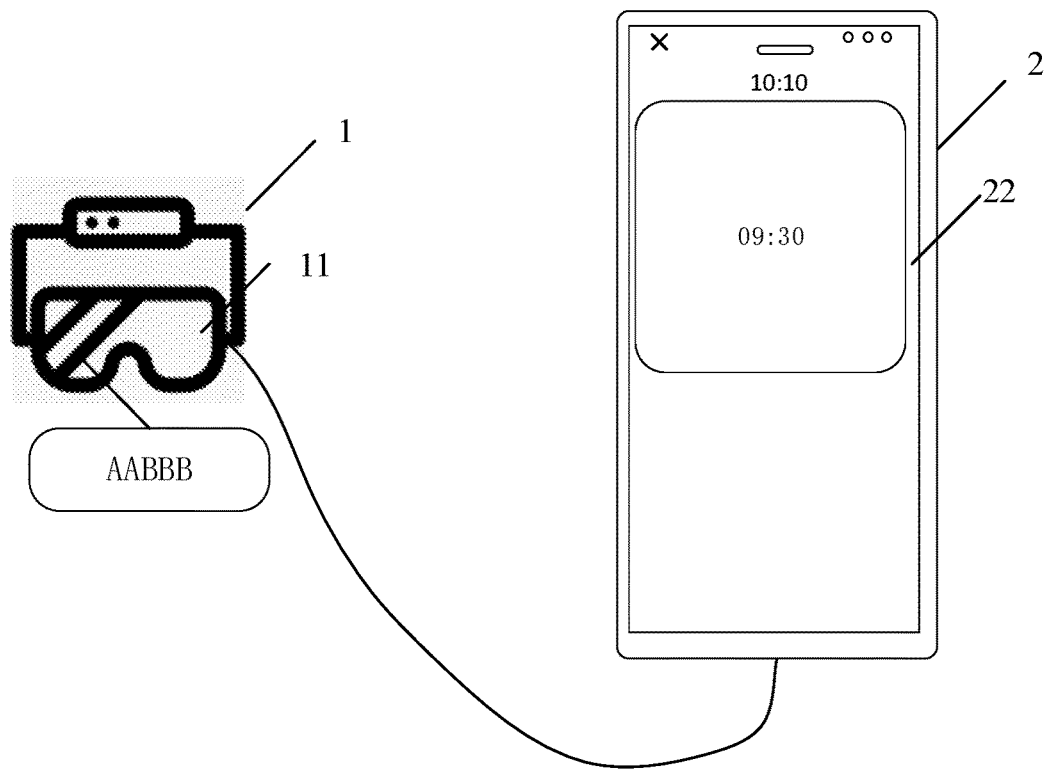
FIG. 5 schematically shows that the augmented reality information prompting system shown in FIG. 2 displays different content on the head-mounted display equipment and the mobile equipment.

As shown in FIG. 5, the head-mounted display equipment 1 includes a first display screen 11, which may be a display screen of the augmented reality display 140. The first display screen 11 is used to display the content of the prompt information.

The above-mentioned processor 130 is located in the mobile equipment 2 (the processor is not shown in FIG. 5), and the mobile equipment 2 further includes a second display screen 22. The second display screen is used to display other interface image that does not contain the content of the prompt information while the first display screen 11 displays the content of the prompt information.

That is, at the same time that the content of the prompt information is displayed on the first display screen 11, other interface image that does not contain the content of the prompt information is displayed on the second display screen 22. For example, the other interface image may be a countdown interface image, a page turning interface image, a screen saver interface image, and the like. The countdown interface image can assist the user to view the speech time.

For example, in FIG. 5, the text content displayed on the first display screen 11 of the head-mounted display equipment 1 is "AABBB", and the interface image displayed on the second display screen 22 of the mobile equipment 2 is a clock countdown interface.

The prompt content displayed by the head-mounted display equipment 1 needs to be obtained from the mobile equipment 2. If the prompt content is still displayed on the mobile equipment 2, the security of the displayed equipment content may be low. The exemplary embodiment of the present disclosure proposes the above-mentioned mechanism of different display on two screens, which can effectively avoid the display security problem caused by displaying the content of the prompt information on the mobile equipment 2 and the head-mounted display equipment 1 at the same time.

Figure 6:
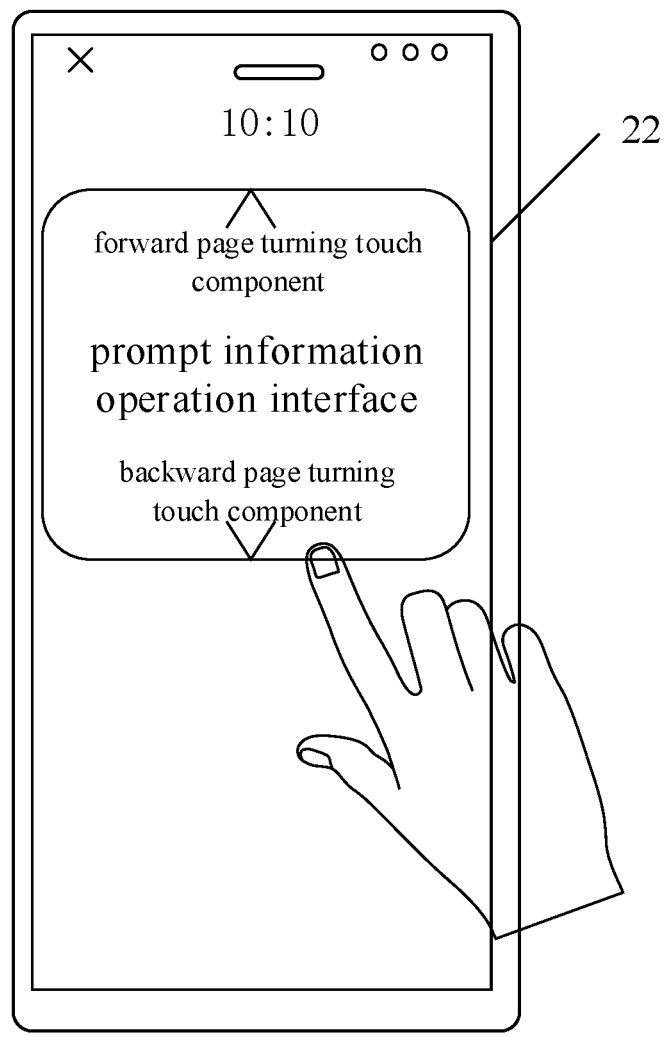
FIG. 6 schematically shows that the augmented reality information prompting system shown in FIG. 2 displays a prompt information operation interface on a mobile equipment.

As shown in FIG. 6, the mobile equipment 2 may include a second display screen 22 and a processor. The second display screen 22 and the processor (not shown in FIG. 6) may be connected by a data cable, or by any suitable way to establish a communication connection. The second display screen 22 is used to display the prompt information operation interface and receive operation control data input on the prompt information operation interface. The processor is used to receive operation control data, and to generate a second display control instruction according to the control operation data to control the display state of the content of the prompt information on the head-mounted display equipment 1. Therefore, when the user needs to turn the page of the speech draft, for example, the user can operate the content of the speech draft through the prompt information operation interface provided by the mobile equipment 2.

In some exemplary embodiments, the above-mentioned second display screen 22 may be a touch display screen. Therefore, the above-mentioned operation control data may refer to the detected touch operations with respect to the touch components included in the prompt information operation interface. For example, the prompt information operation interface may include a page turning area, and the page turning area may include a forward page turning touch component, a backward page turning touch component, or a preset time touch component for automatic page turning. In this case, the operation control device 120 is implemented as the touch display screen of the mobile equipment 2.

In the display process of the prompt information, in order to facilitate the user to control the display state of the prompt word content, the present disclosure also proposes to operate the prompt information operation interface displayed on the second display screen 22 of the mobile equipment 2 to effectively control the content of the prompt information.

For example, the first operation input by the user for the prompt information document is received on the second display screen 22, and in response to the first operation input by the user, the prompt information operation interface is displayed on the second display screen 22. The first operation, for example, may be a click touch.

When the second operation input via the touch component in the prompt information operation interface is detected, in response to the second operation, the prompt information document is controlled so as to be adjusted from the current display position to the display position corresponding to the second operation. For example, for a click operation of the "forward page turning touch component" in the prompt information operation interface, the new prompt information content is displayed on the head-mounted display equipment, and the new prompt information content is the content corresponding to a display position obtained by adjusting forward from the current display position.

In order to carry out convenient operation of the prompt information content, the user may adjust the display position of the prompt information content through the prompt information operation interface displayed on the second display screen 22. The user may also modify the setting of the automatic page turning time by long pressing the automatic page turning touch component, thereby improving the operability of the prompt information display state for the user.

In a scenario where the head-mounted display equipment 1 displays the prompt information, the power supply of the head-mounted display equipment 1 is usually provided by the mobile equipment 2. However, the user may easily touch the power button while using the mobile equipment 2, which may cause the display content of the head-mounted display equipment 1 to temporarily stop, interrupting the speech-maker's speech process. In order to solve this problem, an exemplary embodiment of the present disclosure also provides another implementation of the augmented reality information prompting system.

Figure 7:
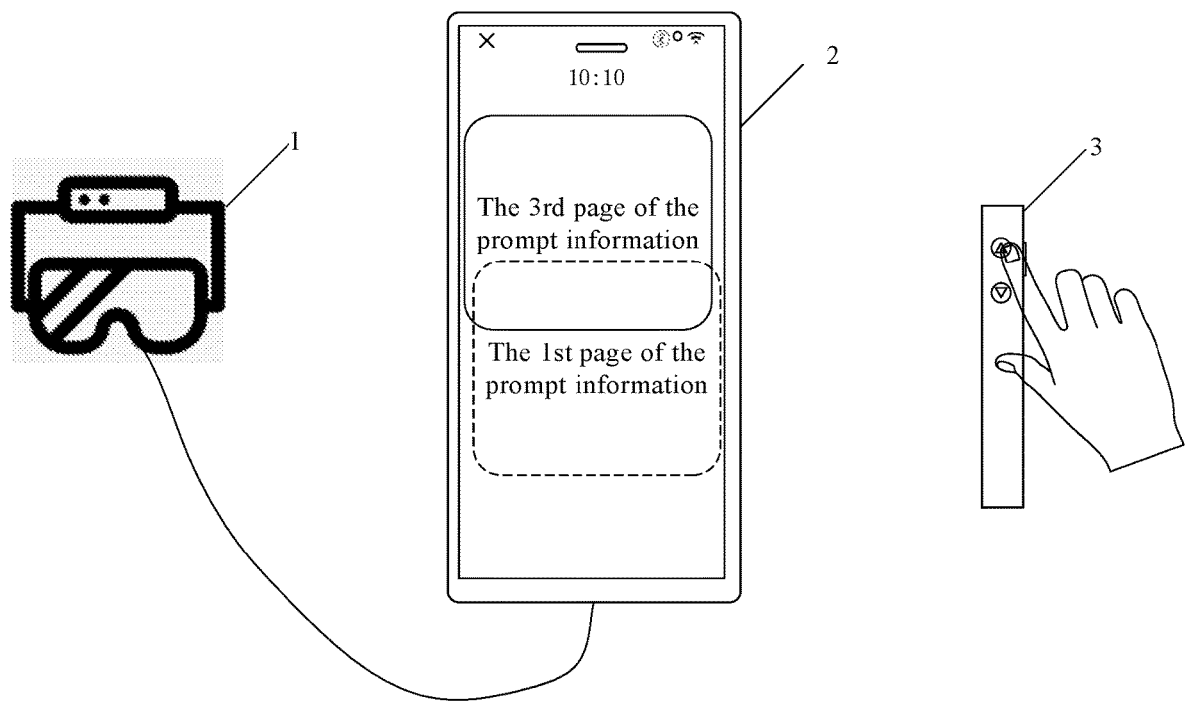
FIG. 7 schematically shows the structure of yet another implementation of the augmented reality information prompting system provided according to the exemplary embodiment of the present disclosure.

Please referring to FIG. 7, it schematically shows the structure of yet another implementation of the augmented reality information prompting system provided according to the exemplary embodiment of the present disclosure. The augmented reality information prompting system includes a head-mounted display equipment 1 and a mobile equipment 2, and a communication connection is established between the head-mounted display equipment 1 and the mobile equipment 2. The system also includes a control handle 3, which can establish a communication connection with the mobile equipment 2 through any suitable wireless or wired connection. The control handle 3 is used to receive input operation control data and send the operation control data to the processor of the mobile equipment 2.

The processor of the mobile equipment 2 is used to receive the control operation data, and to control the display state of the content of the prompt information on the head-mounted display equipment 1 according to the operation control data.

The above-mentioned control handle 3 may be a Bluetooth handle, a projector control pen, and the like. When the control handle 3 is a Bluetooth handle, the user sends operation data to the mobile equipment 2 by operating the buttons on the Bluetooth handle. After receiving the operation data sent by the Bluetooth handle, the mobile equipment 2 can control the display state of the content of the prompt information on the head-mounted display equipment 1 according to the operation control data.

As a non-limiting example, the user can continuously operate the page-up button provided on the Bluetooth handle three times (for example, to press the page-up button 3 times), and the touch detection module of the Bluetooth handle is used to detect the number of pressing operation for the page-up button. The touch detection module sends the number of press operations and the indicator corresponding to the page-up button to the processor of the Bluetooth handle, and the processor of the Bluetooth handle is used to receive the number of press operation and the indicator corresponding to the page-up button sent by the touch detection module, and to encapsulate the number of pressing operation and the indicator corresponding to the page-up button into signaling data, to send the signaling data to the mobile equipment 2. The processor 130 of the mobile equipment 2 parses the received signaling data to obtain the operation control data; and controls the display state of the prompt content according to the operation control data. That is, the prompt content will be turned three pages forward from the current display page.

As a non-limiting example, when the control handle 3 is a projector control pen, the projector control pen needs to be configured and set first. For example, the projector control pen is paired with the mobile equipment 2 first. After the pairing operation is completed, the operating parameters corresponding to the buttons of the projector control pen are obtained, and the corresponding operating parameters are displayed on the touch screen of the mobile equipment. The operation parameters of the buttons of the projector control pen can be reconfigured according to the user's personalized setting requirements, or the default operation parameters of the buttons of the projector control pen can be accepted.

The exemplary embodiment of the present disclosure uses the control handle 3 to avoid the display interruption problem caused by the user accidentally touching the power button during the use of the mobile equipment 2 and thus to effectively improve the display control efficiency of the prompt information.

Figure 8:
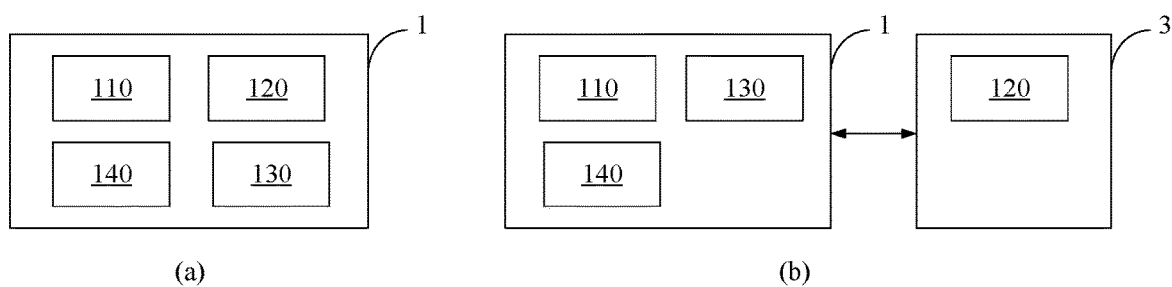
FIG. 8 schematically shows, in the form of a block diagram, the structures of another two possible implementations of the augmented reality information prompting system provided according to the exemplary embodiment of the present disclosure.

Referring to FIG. 8, it schematically shows, in the form of a block diagram, the structures of another two possible implementations of the augmented reality information prompting system provided according to the exemplary embodiment of the present disclosure. As shown in FIG. (a) of FIG. 8, the augmented reality information prompting system can be implemented as a head-mounted display equipment 1, that is, the head-mounted display equipment 1 may include the head pose detector 110, the operation control device 120, the processor 130 and the augmented reality display 140. In this implementation, the operation control device 120 may be configured to detect the user's gesture to generate corresponding operation control data. The operation control data can be sent to the processor 130 to generate the second display control instruction. The head pose detector 110, the processor 130, and the augmented reality display 140 all operate as described above, and will not be repeatedly described again.

As shown in FIG. (b) of FIG. 8, the augmented reality information prompting system can include a head-mounted display equipment 1 and a control handle 3. The head-mounted display equipment 1 may include the head pose detector 110, the processor 130 and the augmented reality display 140, and the control handle 3 may include the operation control device 120. The control handle 3 and the head-mounted display equipment 1 can establish a communication connection through any suitable wireless or wired connection. The control handle 3 is used to receive input operation control data and to send the operation control data to the processor 130 of the head-mounted display equipment 1.

It should be understood that the augmented reality information prompting system 100 according to the present disclosure can be implemented in any suitable form, as long as it includes the above-mentioned head pose detector 110, the operation control device 120, the processor 130 and the augmented reality display 140, and can carry out the corresponding operations.

Figure 9:
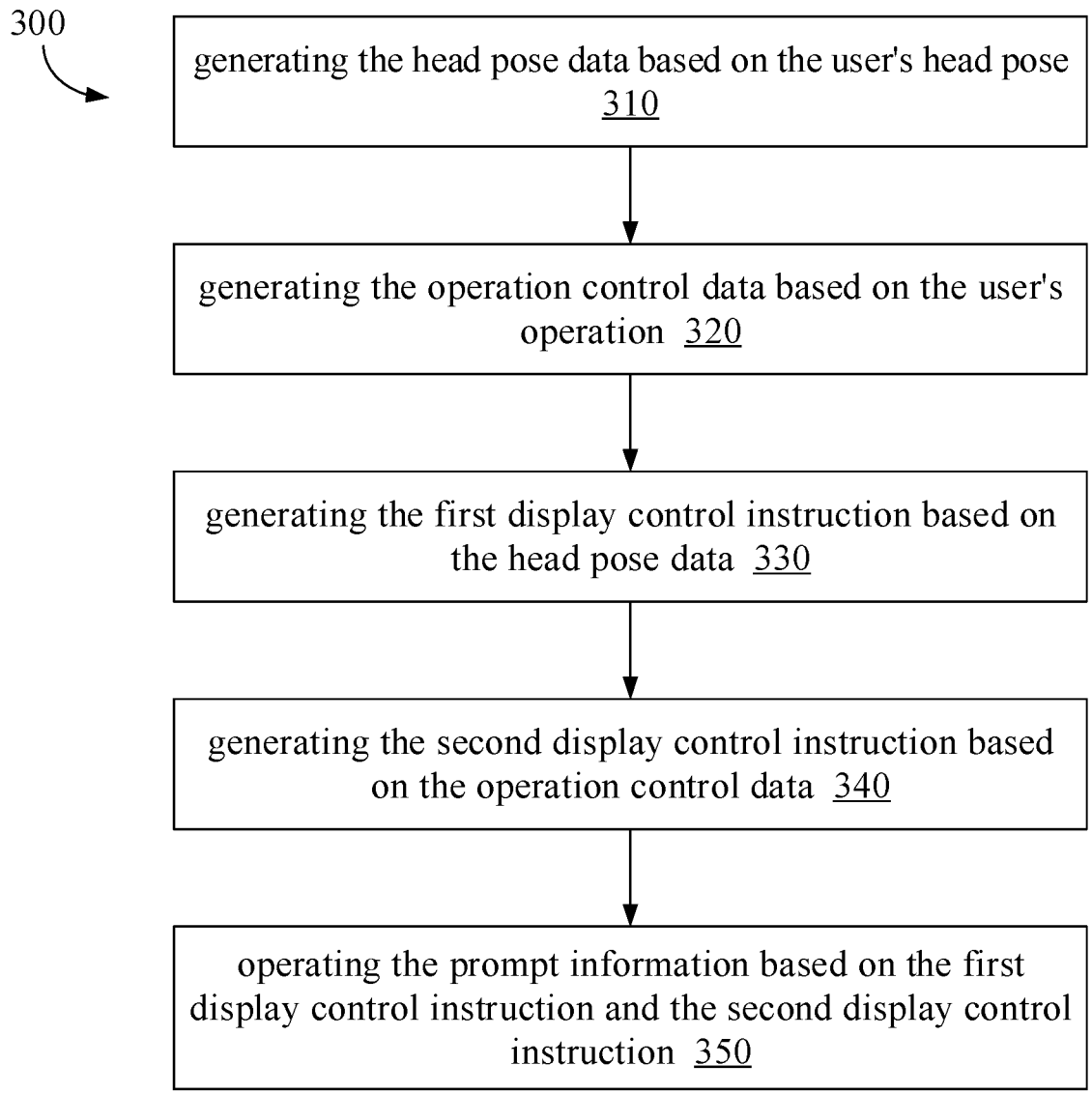
FIG. 9 schematically shows, in the form of a flowchart, a display control method applicable to the above-mentioned augmented reality information prompting system according to the exemplary embodiment of the present disclosure.

The display control method applicable to the above-mentioned augmented reality information prompting system according to the exemplary embodiment of the present disclosure will be described hereinafter with reference to FIG. 9. Please referring to FIG. 9, the display control method includes the following steps:

step 310, generating the head pose data based on the user's head pose;

step 320, generating the operation control data based on the user's operation;

step 330, generating the first display control instruction based on the head pose data;

step 340, generating the second display control instruction based on the operation control data; and step 350, operating the prompt information based on the first display control instruction and the second display control instruction.

In the above steps, the step 330 of generating the first display control instruction based on the head pose data may further include: determining the user's head rotation angle value based on the head pose data; and generating the first display control instruction based on the head rotation angle value.

When the head rotation angle value is within a predetermined range (that is, the content display angle value range), the first display control instruction instructs the augmented reality display to display the prompt information; and when the head rotation angle value is outside the predetermined range, the first display control instruction instructs the augmented reality display to suspend display (that is, to instruct that the content of the prompt information is not visible).

The above-mentioned calculation of the head rotation angle of the wearer based on the head pose data may include:

receiving current head pose data, which is collected at a preset interval after the head-mounted display equipment completes the initial configuration;

calculating the Euler angle of the target direction according to the current head pose data;

determining the head rotation angle value based on the Euler angle of the target direction.

Before receiving the head pose data from the head-mounted display equipment, the method may include:

receiving the initial operation data sent by the control device from the head-mounted display equipment;

receiving the initial head pose data sent by the head-mounted display equipment;

according to the initial operation data and the initial head pose data, setting the initial pose data of the head-mounted display equipment, and the initial pose data is used to calculate the head rotation angle value.

In the above-mentioned exemplary embodiment, the step 320 of generating operation control data based on the user's operation in the method may further include: generating the operation control data based on the user's gesture, or generating the operation control data based on the user's input data.

The above-mentioned step of generating the operation control data based on the user's input data may further include:

receiving the input data sent by the control handle; or, receiving the input data sent by the mobile equipment, wherein the input data is detected through the second display screen of the mobile equipment.

On the basis of the above-mentioned exemplary embodiment, the above head-mounted display equipment may further include a first display screen, where the first display screen is used to display the prompt content;

The processor may be provided in the mobile equipment, and the mobile equipment may further include a second display screen, and the second display screen is used to display other interface image that does not contain the prompt content while the prompt content is displayed on the first display screen. The processor and the second display screen are connected through a data cable.

The exemplary embodiment of the present disclosure receives the head pose data from the head-mounted display equipment through the mobile equipment, calculates a head rotation angle value according to the head pose data, and then controls the display state of the content of the prompt information according to the head rotation angle value, and thereby effectively avoiding the problem caused by continuously displaying the content of the prompt information on the head-mounted display equipment.

Figure 10:
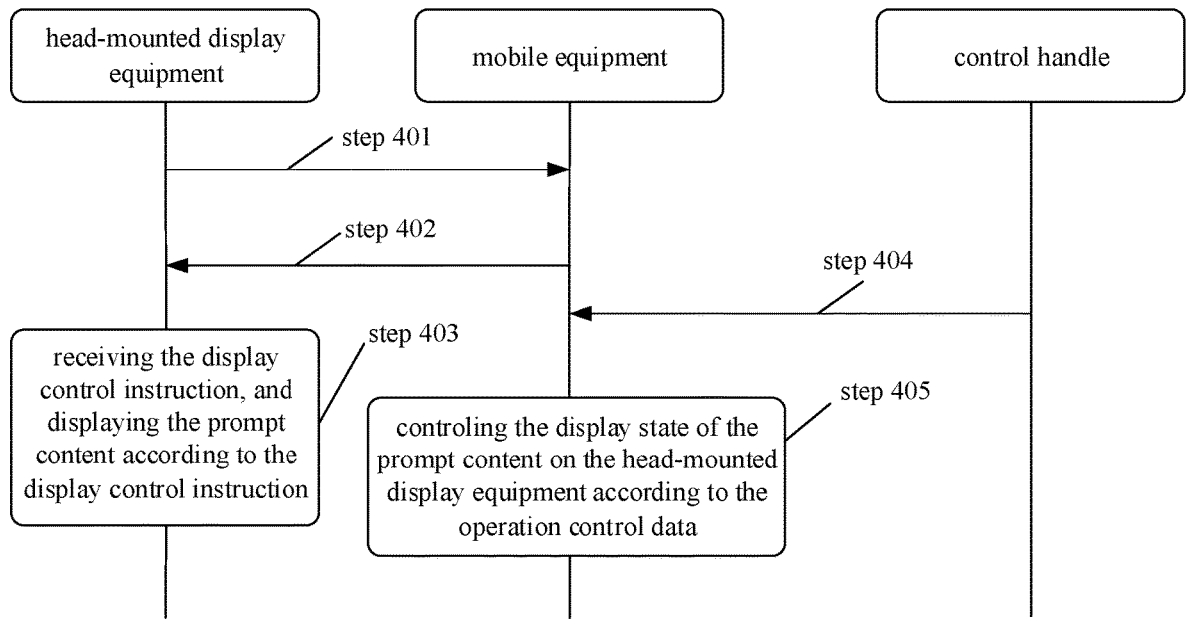
FIG. 10 shows, in the form of an interactive schematic diagram, the display control method applicable to the above-mentioned augmented reality information prompting system according to the exemplary embodiment of the present disclosure.

The display control method according to an exemplary embodiment of the present disclosure will be further described hereinafter in conjunction with FIG. 10. Please referring to FIG. 10, it shows an interactive schematic diagram of a display control method according to an exemplary embodiment of the present disclosure. The display control method can be applied to the augmented reality information prompting system shown in FIG. 7. The display control method can be implemented interactively by the head-mounted display equipment 1, the mobile equipment 2 and the control handle 3, the mobile equipment 2 is equipped with the processor 130, and the display control method includes:

step 401, the head-mounted display equipment sends the collected head pose data to the mobile equipment, and the processor of the mobile equipment receives the head pose data of the wearer sent by the head-mounted display equipment;

step 402, the processor of the mobile equipment sends a display control instruction to the head-mounted display equipment according to the head pose data, wherein the display control instruction is used to control the display state of the content of the prompt information on the head-mounted display equipment;

step 403, the head-mounted display equipment receives the display control instruction, and displays the prompt content according to the display control instruction;

step 404, the mobile equipment receives the operation control data sent by the control handle;

step 405, the mobile equipment controls the display state of the prompt content on the head-mounted display equipment according to the operation control data.

The above-mentioned head-mounted display equipment 1 may include the head pose detector 110 and the augmented reality display 140. As a non-limiting example, the head posture detector 110 may include an inertial measurement unit, and the augmented reality display 140 may include the first display screen 11. The inertial measurement unit can be used to collect head pose data and send it to the mobile equipment 2. The first display screen 11 may be used to receive the first display control instruction determined according to the head pose data and sent by the mobile equipment 2 and operate the content of the prompt information according to the first display control instruction sent by the mobile equipment 2.

Taking the head-mounted display equipment as an pair of AR glasses, the mobile equipment as a mobile phone, and the control handle as a Bluetooth handle as an example, the example of the present disclosure will be further described in conjunction with the display control method described in the foregoing exemplary embodiments. The user wearing the AR glasses sets the presentation mode of the prompt information presented in the AR glasses through the display setting interface presented by the mobile equipment. For example, the display setting interface may include the setting of content path rotation of the prompt information, font size, line spacing, background color, font color, rotation angle value and font type.

The mobile equipment may include a second display screen, such as the touch display screen of a mobile phone. The display setting interface is displayed on the touch display screen and a prompt message is presented. The prompt message is used to prompt the user to keep his head facing forward and to prompt the user to press the initial pose setting button provided on the Bluetooth handle. The processor of the mobile phone receives the initial head pose data detected by the AR glasses and the button information returned by the Bluetooth handle, sets the user's initial pose state according to the initial head pose data and button information, and the processor subsequently uses the initial pose state to calculate the wearer's real-time head rotation angle value.

The processor may also prompt whether it is necessary to reset the initial pose state, and if yes, return to the setting step of the user's initial pose state, if not, continue to obtain the inertial measurement unit data from the AR glasses. For example, the inertial measurement unit data can be obtained by using the Android USB Host mechanism to communicate with HID devices.

After the processor obtains the inertial measurement unit data, it performs Euler angle calculation on the inertial measurement unit data, and obtains the rotation angle value of the head of the wearer of the AR glasses in the yaw direction as the head rotation angle value.

The processor determines whether the head rotation angle value of the wearer of the current AR glasses is equal to the preset head rotation angle value, and if so, it dynamically modifies the visibility of the Android UI controls arranged in the display module corresponding to the first display screen, and controls the prompt content to be displayed on the first display screen. Otherwise, it is further determined whether the wearer of AR glasses expects to exit the prompt content display, if yes, exits, otherwise returns to the setting step of the user's initial pose state.

The above-mentioned inertial measurement unit data can be obtained by using the Android USB Host mechanism to communicate with the HID device.

The processor can monitor in real time whether the user presses the buttons provided on the Bluetooth handle.

After detecting that the user performs a pressing operation on any of the preset buttons KEYCODE_BUTTON_A, KEYCODE_BUTTON_Y, KEYCODE_BUTTON_X, and KEYCODE_BUTTON_B on the Bluetooth handle, the processor obtains the button value information corresponding to the pressed button.

When the processor receives a pressing signal for the button KEYCODE_BUTTON_A, it controls the prompt content to page up, that is, to adjust the prompt content, for example, from the comment information of the second slide of a PPT document to the corresponding comment information of the first slide, or to display the comment information corresponding to the position of the slide of the PPT according to the operation of the page turning control button of the PPT.

When the processor receives a pressing signal for the button KEYCODE_BUTTON_Y, it controls the prompt content to page down. For example, the comment information of the second slide of the PPT document is adjusted to the comment information corresponding to the third slide.

When the processor receives the pressing signal for the button KEYCODE_BUTTON_X, it resets the initial pose of the user.

When the processor receives the pressing signal for the button KEYCODE_BUTTON_B, it returns to the basic information setting interface.

It should be noted that although the operations of the display control method of the present disclosure are described in a specific order in the drawings, this does not require or imply that these operations must be performed in the specific order, or that all the operations as shown must be performed to achieve the desired result. On the contrary, the steps depicted in the flowchart may change the performing order, or be performed at the same time. Additionally or alternatively, some steps may be omitted, a plurality of steps may be combined into one step for execution, and/or one step may be decomposed into multiple steps for execution.

It should be understood that the devices or apparatus included in the above-mentioned augmented reality information prompting system correspond to the steps in the method described with reference to FIG. 9. Therefore, the operations and features described above for the method are also applicable to the above-mentioned augmented reality information prompting system and the devices or apparatus contained therein, and thus will not be repeatedly described again here. The above method can be implemented in the browser or other security applications of an electronic equipment in advance, and can also be loaded into the browser or the security applications of the electronic equipment by means of downloading or the like. The corresponding steps of the above method can cooperate with the units in the electronic equipment to realize the solutions of the exemplary embodiments of the present disclosure.

Figure 11:
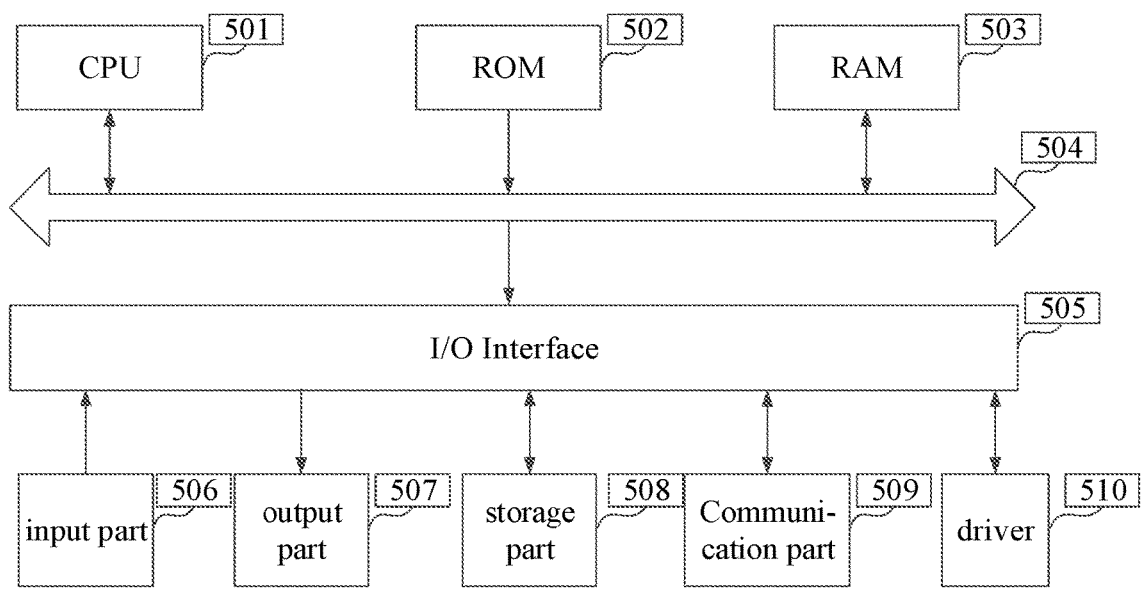
FIG. 11 schematically shows a system structure of a mobile equipment that can be used in an exemplary embodiment of the present disclosure.

Reference is now made to FIG. 11, which shows a schematic diagram of a system structure of the mobile equipment suitable for implementing exemplary embodiments of the present disclosure.

As shown in FIG. 11, the system of the mobile equipment may include a central processing unit (CPU) 501, which can perform various appropriate actions and processes in accordance with a program stored in a read only memory (ROM) 502 or a program loaded from the storage part 508 into a random access memory (RAM) 503. In the RAM 503, various programs and data required for system operations are also stored. The CPU 501, the ROM 502, and the RAM 503 are connected to each other through a bus 504. An input/output (I/O) interface 505 is also connected to the bus 504.

The following components are connected to the I/O interface 505: an input part 506; an output part 507; a storage part 508, and a communication part 509. The communication part 509 performs communication processing via a network such as the Internet. The driver 510 is also connected to the I/O interface 505 as needed.

Several modules or units are mentioned in the detailed description above, but this division is not mandatory. In fact, according to the embodiments of the present disclosure, the features and functions of two or more modules or units described above may be embodied in one module or unit. Conversely, the features and functions of one module or unit described above can be further divided into multiple modules or units so as to be further embodied. In addition, according to an exemplary embodiment of the present disclosure, the process described above with reference to the flowchart of FIG. 9 may be implemented as a computer software program. As a non-limiting example, the exemplary embodiments of the present disclosure include a computer program product, which includes a computer program carried on a non-transitory computer readable medium, and the computer program includes program codes for performing the method shown in the flowchart. In such an exemplary embodiment, the computer program may be downloaded and installed from the network through the communication part 509, and/or installed from the removable medium 511. When the computer program is executed by the CPU 501, the above-mentioned functions defined in the system of the present application are executed.

It should be noted that the non-transitory computer-readable medium in the present disclosure may be a computer-readable storage medium. The computer-readable storage medium may be, for example, but not limited to, an electrical, magnetic, optical, electromagnetic, infrared, or semiconductor system, apparatus or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than a computer-readable storage medium. The computer-readable medium may send, propagate, or transmit the program for use by or in combination with the instruction execution system, apparatus or device. The program code contained on the computer-readable medium can be transmitted by any suitable medium, including but not limited to: wireless, wire, optical cable, RF, etc., or any suitable combination of the above.

As a non-limiting embodiment, the present disclosure provides a non-transitory computer-readable storage medium. The computer-readable storage medium may be included in the electronic equipment described in the above-mentioned embodiments; it may also exist alone instead of being assembled into the electronic equipment. The non-transitory computer-readable storage medium stores one or more programs, and when the foregoing programs are used by one or more processors to execute, the programs implement the display control method for the augmented reality information prompting system described in the present disclosure.

The flowcharts and block diagrams in the drawings illustrate the possible implementation architecture, functions and operations of the system, method, and computer program product according to various exemplary embodiments of the present disclosure. In this regard, each block in the flowchart or block diagram may represent a module, program segment, or part of the code, and the aforementioned module, program segment, or part of the code contains one or more executable instructions for realizing the specified logical functions. It should also be noted that, in some alternative implementations, the functions marked in the blocks may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or can be implemented by a combination of dedicated hardware and computer instructions.

The units or modules involved in the embodiments described in the present application can be implemented in software or hardware. The described unit or module can also be provided in the processor, for example, it can be described as: a processor includes a pose data receiving module and a prompt word content sending module. Among them, the names of these units or modules do not constitute a limitation on the units or modules themselves under certain circumstances. For example, the pose data receiving module can also be described as "a module for receiving head pose data sent by head-mounted display equipment".

The above description is merely an illustration of exemplary embodiments of the present disclosure and the applied technical principles. Those skilled in the art should understand that the scope of disclosure involved in the present disclosure is not limited to the technical solutions formed by the specific combination of the above technical features, but should also cover other technical solutions formed by any combination of the above technical features or their equivalent features without departing from the aforementioned disclosed concept, for example, those technical solutions formed by replacing the above-mentioned features with the technical features disclosed in this disclosure (but not limited to) having similar functions.

What is claimed is:

1. An augmented reality information prompting system comprising a smart phone and a head-mounted display equipment, wherein:
   the smart phone comprises:
      an operation control device configured to generate operation control data based on the user's operation;
      a processor configured to receive head pose data and generate a first display control instruction based on the head pose data, and to receive the operation control data from the operation control device and generate a second display control instruction based on the operation control data,
   the head-mounted display equipment comprises:
      a head pose detector configured to detect a user's head pose to generate the head pose data;
      an augmented reality display configured to receive the first display control instruction and the second display control instruction from the processor, and to operate the prompt information based on the first display control instruction and the second display control instruction,
   wherein the processor is also configured to collect and analyze the user's operating habit data, and to determine a content display angle range for the prompt information based on the user's operating habit data, and
   wherein the augmented reality information prompting system is used for providing prompt information to a user during a speech.

2. The augmented reality information prompting system according to claim 1, wherein the head pose detector comprises an inertial measurement unit.

3. The augmented reality information prompting system according to claim 1, wherein the processor determines the user's head rotation angle value based on the head pose data, and when the head rotation angle value is within the content display angle range, the first display control instruction instructs the augmented reality display to display the prompt information.

4. The augmented reality information prompting system according to claim 3, wherein the first display control instruction instructs the augmented reality display to suspend display when the head rotation angle value is outside the content display angle range.

5. The augmented reality information prompting system according to claim 1, wherein the second display control instruction instructs the augmented reality display to perform a page turning operation on the prompt information.

6. The augmented reality information prompting system according to claim 1, wherein the operation control device comprises one or more buttons of the smart phone, and is configured to receive input data of the user to generate the operation control data.

7. The augmented reality information prompting system according to claim 1, wherein the operation control device comprises a touch screen of the smart phone, and the touch screen is configured to display a prompt information operation interface for receiving input data of the user to generate the operation control data.

8. The augmented reality information prompting system according to claim 2, further comprising a control handle, wherein the operation control device is configured to receive data from the control handle to generate the operation control data.

9. The augmented reality information prompting system according to claim 1, wherein the smart phone comprises a display screen, and when the augmented reality display displays the prompt information, the display screen of the smart phone displays content that is different from the prompt information or suspends display.

10. A display control method for controlling the augmented reality information prompting system according to claim 1, comprising the following steps:
    generating the head pose data based on the user's head pose by the head pose detector of the head-mounted display equipment;
    generating the operation control data based on the user's operation by the processor of the smart phone;
    generating the first display control instruction based on the head pose data by the processor of the smart phone;
    generating the second display control instruction based on the operation control data by the processor of the smart phone;
    operating the prompt information based on the first display control instruction and the second display control instruction by the augmented reality display of the head-mounted display equipment;
    collecting and analyzing the user's operating habit data;
    determining the content display angle range based on the user's operating habit data.

11. The display control method according to claim 10, wherein the step of generating the first display control instruction based on the head pose data by the processor of the smart phone comprises:
    determining the user's head rotation angle value based on the head pose data;
    generating the first display control instruction based on the head rotation angle value.

12. The display control method according to claim 11, wherein:
    when the head rotation angle value is within the content display angle range, the first display control instruction instructs the augmented reality display to display the prompt information;
    when the head rotation angle value is outside the content display angle range, the first display control instruction instructs the augmented reality display to suspend display.

13. The display control method according to claim 10, wherein the step of generating the operation control data based on the user's operation by the processor of the smart phone comprises:
    generating the operation control data based on the user's gesture.

14. The display control method according to claim 10, wherein the step of generating the operation control data based on the user's operation by the processor of the smart phone comprises:
    generating the operation control data based on input data of the user.

* * * * *